US00H002168H

(19) United States

(12) Statutory Invention Registration

Appleman et al.

(10) Reg. No.: US H2168 H

(43) Published: Sep. 5, 2006

(54) ARRANGEMENT AND CONSTRUCTION OF AN ELEMENT BUNDLING MODULE

(75) Inventors: William M. Appleman, Davidsonville, MD (US); Lawrence P. Murphy, Fairfax, VA (US)

(73) Assignee: The United States of America as represented by the Secretary of the Navy, Washington, DC (US)

(21) Appl. No.: 09/879,870

(22) Filed: Jun. 13, 2001

(51) Int. Cl.
*B01D 63/00* (2006.01)

(52) U.S. Cl. ..... 210/321.72; 210/321.84; 210/321.88

(58) Field of Classification Search ..... 435/1.1, 435/370, 400; 210/650, 433.2, 456, 806, 210/321.1, 321.8, 321.79, 321.88, 500.23; 428/364, 300, 373

See application file for complete search history.

(56) References Cited

U.S. PATENT DOCUMENTS 4,451,369 A * 5/1984 Sekino
4,657,743 A * 4/1987 Kanno
4,668,401 A * 5/1987 Okumura
5,725,949 A * 3/1998 Pasquali
5,916,440 A * 6/1999 Garcera et al. ..... 210/232
6,284,451 B1 * 9/2001 Funatsu
2001/0035374 A1 * 11/2001 Yamamoto

* cited by examiner

*Primary Examiner*—Harvey E. Behrend
(74) *Attorney, Agent, or Firm*—Jacob Shuster

(57) ABSTRACT

Elongated processing elements are anchored at opposite ends thereof between holding discs retained within rigid seal rings enclosing a chamber within a cylindrical module housing, through which a flow of contaminate-laden bilgewater is conducted. Such discs are formed within the seal rings with the elongated elements positioned therein by deposit and curing of epoxy resin. Such elements are then assembled within the module housing to seal the chamber thereby established therein. Spacing between the bundled elements is maintained by spacers to accommodate filtration of the bilgewater during flow thereof through the chamber and lateral outflow of a cleansed filtered portion from the elements through a drain outlet.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

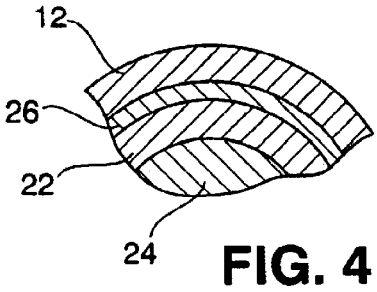
FIG. 4
FIG. 5
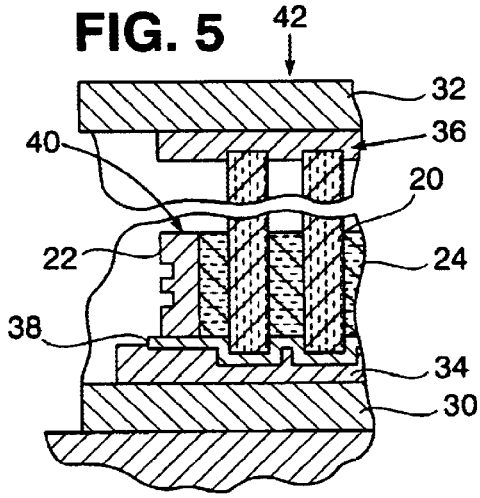

ARRANGEMENT AND CONSTRUCTION OF AN ELEMENT BUNDLING MODULE

The present invention relates in general to a module enclosing bundled elements in different installations.

BACKGROUND OF THE INVENTION

The processing of contaminate laden fluid such as oily wastewater collected within marine vessels, by passage through ultra-filtration membranes for fluid cleansing purposes is generally known in the art, involving a module containing one or more of such filtration membranes having pores through which the oily wastewater percolates during passage through a tubular module housing. Various problems arise with respect to providing a suitable arrangement of apparatus for the performance of such wastewater cleansing operation in such installationson board marine vessels, imposing different handling requirements and dimensional restrictions. It is therefore an important object of the present invention to provide a more efficient and less costly arrangement of bundled elements such as filter membranes within modules for cleansing of contaminate laden fluids such as oily wastewater by filtration through the filter membranes.

SUMMARY OF THE INVENTION

In accordance with the present invention, a plurality of elongated elements of a desired number are disposed in parallel spaced relation to each other within a single tubular housing shell of a module. Where such elongated elements are filter membranes, ultra-filtration processing of a contaminate laden fluid is performed within such module housing to discharge a contaminate cleansed portion of the fluid from a drain. Positioning of and spacing between elongated elements for most compatible and efficient integration and processing is effected by anchoring of opposite axial end portions of such elements within the module housing to form a bundle enclosed within a percolation chamber from which the filtration cleansed fluid portion is drained. Sealing of such percolation chamber and positioning of the filter elements therein is effected by use of a pair of axially spaced seal rings seating annular seals in contact with the internal cylindrical surface of the module shell housing. Each of such seal rings retains an epoxy resin holding disc within which the axial end portions of the filter membrane elements are held positioned in parallel spaced relation to each other. The spacings between such filter elements are maintained throughout within the percolation chamber between the filter holding discs by pairs of rubber spacer o-rings located on the filter elements adjacent to the filter holding discs and midway therebetween. The filter holding discs are formed from bodies of epoxy resin respectively cured in-situ within the seal rings with the filter elements positioned therein before assembly within the filtration module housing.

As a result of the foregoing described constructional arrangement and associated fabrication procedure, processing efficiency in the case of filtration is maximized by increasing surface area exposure of the filter elements within a single module housing, minimizing and maintaining spacing between the filter elements positioned therein and sealing the percolation chamber therein. Energy losses as well as leakage are thereby reduced and fabrication costs minimized by limiting close tolerance to the seal rings. Further, the foregoing benefits may be applied to modules of different dimensions, while replacement of parts may be limited to the filter element holding discs formed by in-situ curing of the epoxy resin, should fabrication defects occur, so as to avoid replacement of the filter membrane elements. The arrangement of the present invention while applicable to other installations such as heat exchange tubes bundled within a module shell, is applied to bundling and sealing of filtration membrane elements within the module shell in order to maximize surface area convection. The number of such elements for a given shell size is thereby increased and the cost of sealing individual elements is lowered.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIGS. 3 and 4 are partial transverse section views taken substantially through planes indicated by section lines 3—3 and 4—4 in FIG. 2;

FIG. 5 is a partial side section view of an arrangement of filter elements within a body of epoxy resin retained within a seal ring during curing under clamping pressures, before fabrication completion and assembly of the module shown in FIGS. 1–4.

DETAILED DESCRIPTION OF PREFERRED EMBODIMENTS

Figure 1:
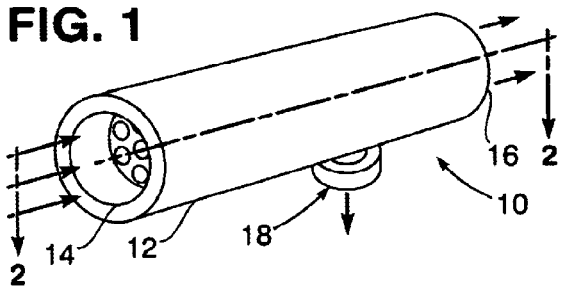
FIG. 1 is a perspective view of a filtration module constructed in accordance with one embodiment of the present invention.

Referring to the drawing in detail, FIG. 1 illustrates a module 10 having an outer cylindrical housing 12 extending longitudinally between an axial inlet end 14 thereof and its other axial outlet end 16. Such module housing 12 is made of a rigid material having suitable properties such as a metal or plastic having fluid confining and contaminate resisting properties. In such case a contamination laden fluid such as oily wastewater enters at the inlet end 14 and is processed so as to separate a contaminate cleansed fluid portion before exiting from the outlet end 16. Such separated cleansed fluid portion is discharged from a drain 18 located on the housing 12, spaced between the outlet end 16 and the inlet end 14.

Figure 2:
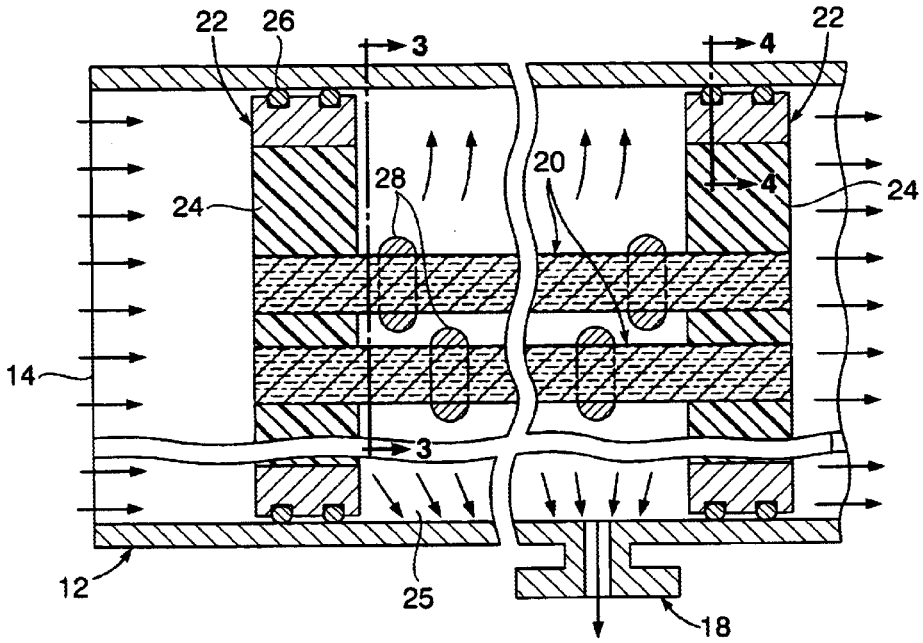
FIG. 2 is a partial longitudinal section view of the module shown in FIG. 1, taken substantially through a plane indicated by section line 2—2.
Figure 3:
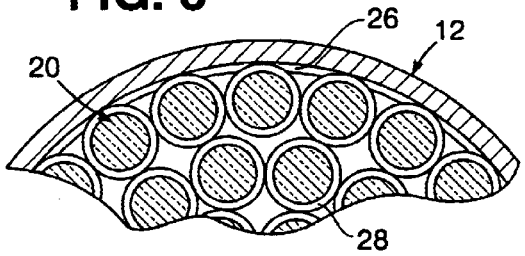

Referring now to FIGS. 2, 3 and 4, ultra-filtration processing within the module housing 12 is performed during passage of the oily wastewater under pressure between the inlet and outlet ends 14 and 16 by a plurality (three or more) of elongated elements 20 in the form of filter membranes. Such separation of water from contaminants occurs as a result of oily bilgewater percolation laterally within a sealed chamber so as to gravitationally collect therefrom the contaminate cleansed portion for discharge therebelow through the drain 18. The elements 20 made of membrane material having pores through which percolation of the bilgewater occurs, are positioned in generally parallel spaced relation to each other by a pair of surrounding rigid annular seal rings 22 within which holding discs 24 molded from epoxy resin are retained for anchoring therein the axial ends of the elements 20. Each of the seal rings 22 is externally grooved for retention of a pair of annular rubber seals 26 in sealing contact with the internal surface of the tubular module housing 12. Radial sealing is thereby established within the module housing 12 by the seal rings 22, with the seals 26 and the filter holding discs 24 to seal a percolation chamber 25 within which ultra-filtration is performed and to avoid mixing between the contaminate cleansed fluid with the contaminate laden fluid during passage through the housing 12.

Figure 3A:
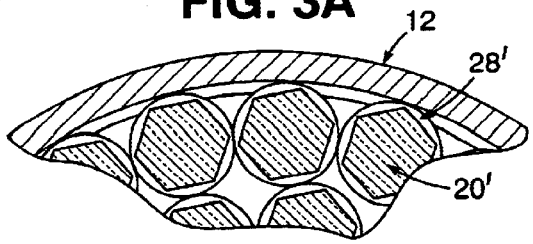
FIG. 3A is a partial section view similar to that of FIG. 3, showing another embodiment.

The elements 20 are maintained in parallel spaced relation to each other between their axial ends by o-ring spacers 28 as shown in FIG. 2. Pairs of such spacers 28 are disposed in close spaced relation to the epoxy resin molded discs 24, in order to sustain spacing throughout between sufficiently stiffened filter elements 20. Positioning of such elements 20 that are circular in cross-section within a bundle formation in the module housing 12 are also thereby effected by the spacers 28 as shown in FIG. 3. FIG. 3A illustrates a modification, wherein comparable elements 20' of hexagonal cross-section are maintained in spaced relation to each other by similar spacers 28'.

The molded epoxy resin discs 24, holding the processing elements 20 in position within the single module 10 together with its seal rings 22, provides a sealing action between the module housing 12 and the bundled elements and between the individual elements so as to separate a contaminant-laden fluid, such as bilgewater, from a cleansed portion discharged through the drain 18 in the case of processing elements that are filter membranes. Dimensional compatibility is thereby also provided so as to accommodate integration of multiple types and different numbers of bundled elements. Such integration of the bundled elements 20 within with the module 10 as a single component for example, is facilitated by an associated fabrication procedure as hereinafter outlined by reference to FIG. 5.

As shown in FIG. 5, a plurality of the elements 20 to be bundled in close parallel spaced relation to each other are disposed in their desired relative positions within a body of uncured epoxy resin from which one of the holding discs 24 is separately formed within one of the seal rings 22 before assembly within a module 10. The epoxy resin in the uncured fluent state will fill all spaces between the axial end portions of the elements 20 to be bounded within the inner diameter of the annular seal ring 22. Positioning of the filter elements 20 during the latter described stage of the fabrication procedure, before molding of said one of the holding discs 24, is established by clamping between fixedly spaced rigid plates 30 and 32 on which resilient material layers 34 and 36 are respectively disposed. To facilitate molding, a thin mold release film 38 is placed on the resilient layer 34 underlying the lower ends of the elements 20 within the uncured body of epoxy resin retained within the seal ring 24 under pressure as denoted by arrow 40 and a clamping pressure on the plate 32 as denoted by arrow 42. The thickness of the holding discs 24 is determined by the height of the seal ring 22. When one of such discs 24 is so formed upon full curing of the epoxy resin after 24 hours for example, the element bundle as shown in FIG. 5 is then rotated 180° and the same fabrication procedure is repeated to form another holding disc 24 at the other ends of the elements 20, not shown in FIG. 5, to complete bundling of the elements before transfer to the module 10 for assembly therein.

The foregoing described arrangement associated with the module 10 may be utilized to sealingly bundle elongated elements, other than filter membranes, in different installations. For example, such elongated elements top be bundled may be electrical cables, optic cables, pneumatic hoses/tubes, etc.

Obviously, other modifications and variations of the present invention may be possible in light of the foregoing teachings. It is therefore to be understood that within the scope of the appended claims the invention may be practiced otherwise than as specifically described

What is claimed is:

1. In combination with a housing of a module enclosing a plurality of elongated processing elements through which a contaminate-laden fluid is filtered; the improvement residing in: sealing means for establishing a sealed chamber within the module housing through which the contaminate-laden fluid is conducted externally of the processing elements; holding means for positioning the elongated processing elements within the sealed chamber in a bundled condition; spacer means for maintaining the bundled processing elements in laterally spaced relation to each other throughout within the sealed chamber to accommodate lateral withdrawal of the filtered fluid from the processing elements as a cleansed portion of the contaminate-laden fluid; and drain means on the housing for discharging said cleansed portion of the contaminate laden fluid from the sealed chamber in response to filtration by the elongated processing elements.

2. The combination as defined in claim 1, wherein said sealing means includes: a pair of axially spaced seal rings in radially outer sealing contact with the module housing; and said holding means is retained within said seal rings for anchoring therein opposite end portions of the processing elements in the bundled condition.

* * * * *